March 25, 1969     D. J. MARLEY     3,434,761
HYDRODYNAMIC SHAFT BEARING
Filed July 11, 1963
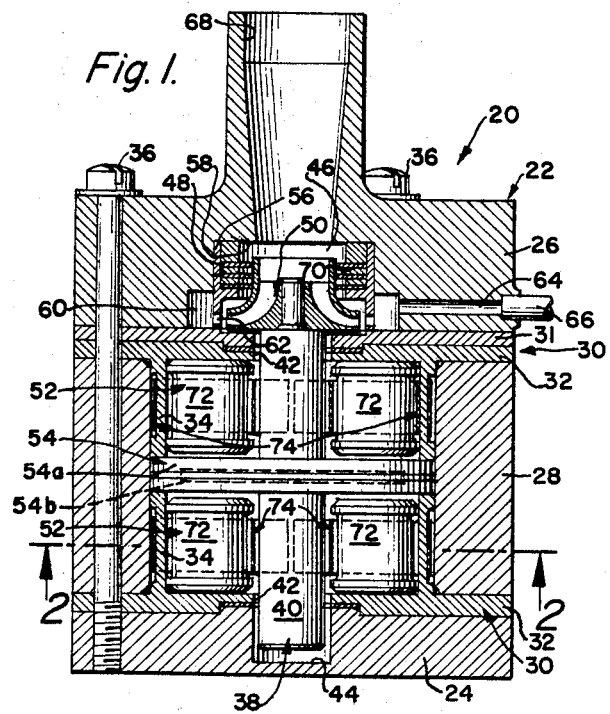
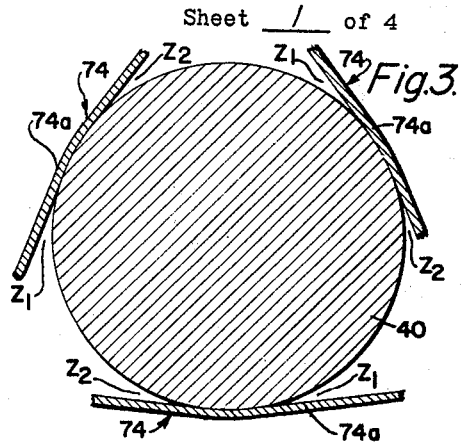
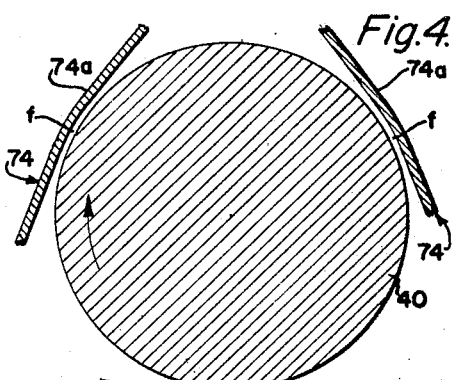
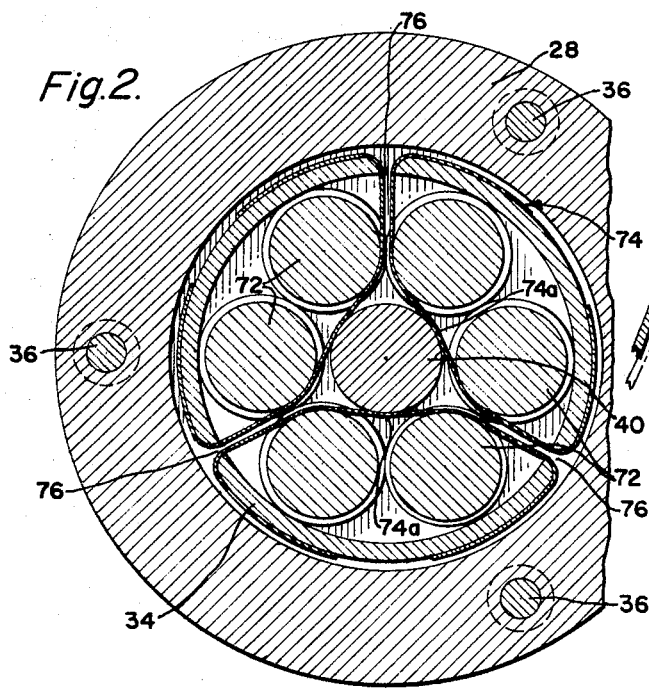
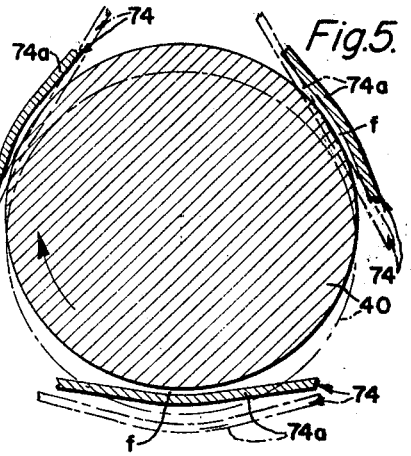
INVENTOR:
DAVID J. MARLEY,
BY
Attorney.

March 25, 1969 D. J. MARLEY 3,434,761
HYDRODYNAMIC SHAFT BEARING
Filed July 11, 1963 Sheet 2 of 4
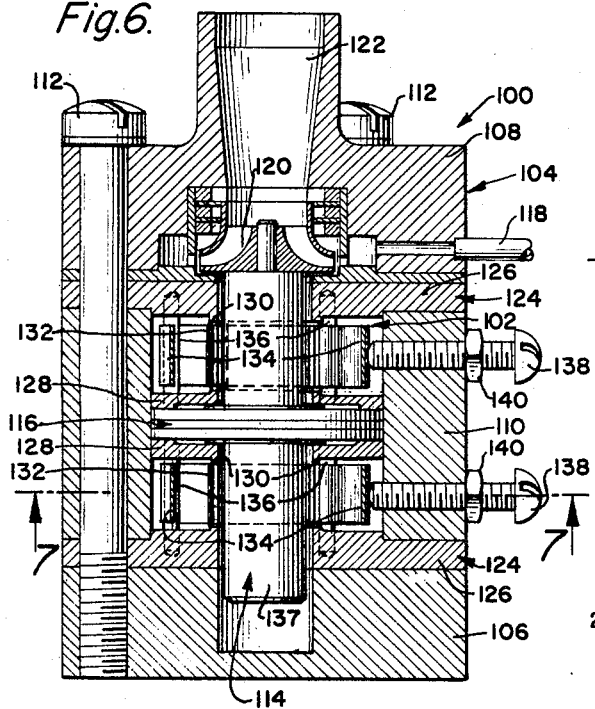
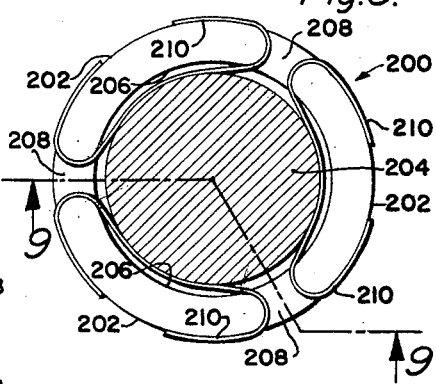
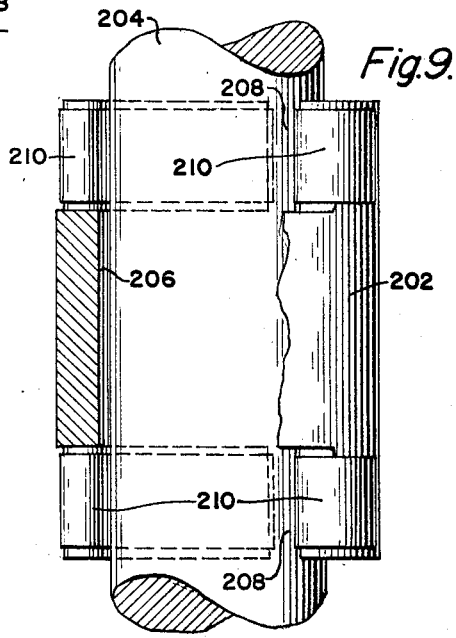
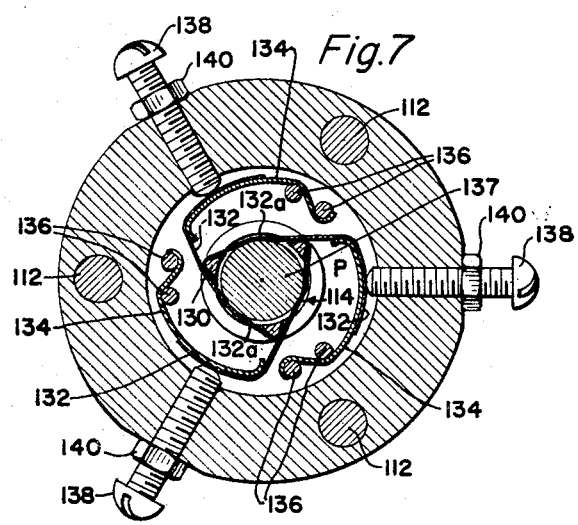
INVENTOR:
DAVID J. MARLEY,
BY
Attorney.

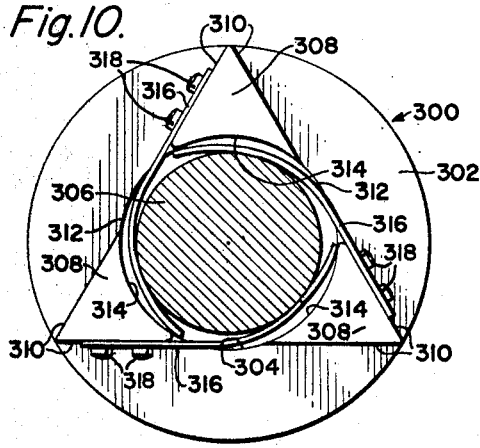
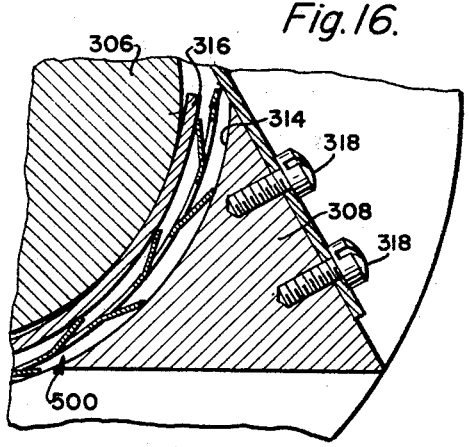
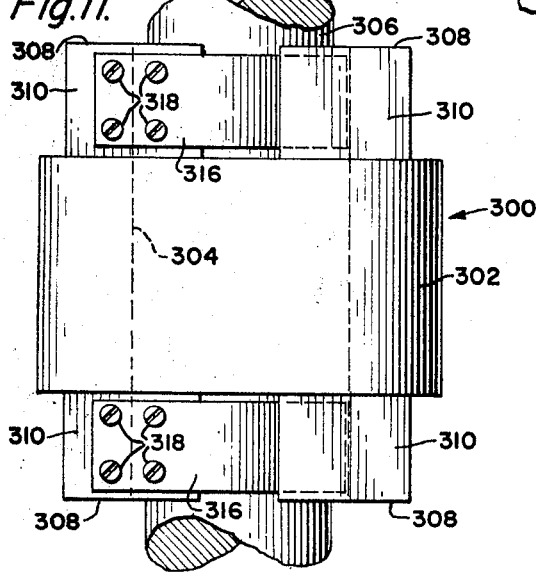
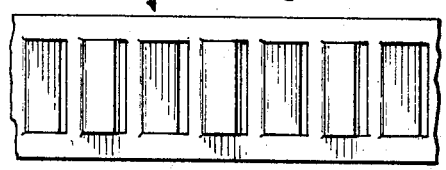
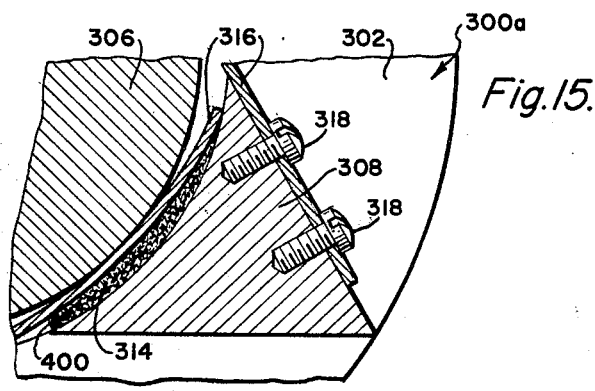

INVENTOR.
DAVID J. MARLEY,
BY
Attorney.

United States Patent Office

3,434,761
Patented Mar. 25, 1969

3,434,761
HYDRODYNAMIC SHAFT BEARING
David J. Marley, Buena Park, Calif., assignor to The Garrett Corporation, Los Angeles, Calif., a corporation of California
Filed July 11, 1963, Ser. No. 294,386
Int. Cl. F16c 7/04, 35/00, 17/06
U.S. Cl. 308—9　　　　　　　　　　　　　　　25 Claims This invention relates generally to rotary bearings and more particularly to improvements in fluid film hydrodynamic rotary bearings.

Rotary bearings may be broadly classified into three groups, as follows:
(1) Bearings which operate with dry friction between the relatively movable bearing surfaces,
(2) Bearings with rolling contact, and
(3) Fluid-film lubricated bearings.

In dry friction bearings, the relatively movable bearing surfaces rub directly against one another with no effective lubricating film therebetween. In bearings with rolling contact, the relatively movable bearing surfaces are supported for relative movement by intervening rollers, balls, or other similar mechanical anti-friction means. Finally, in fluid film lubricated bearings, the relatively movable bearing surfaces are supported for relative movement by an intervening lubricating film.

Included in the group of fluid film lubricated bearings are externally pressurized bearings, commonly referred to as hydrostatic bearings, and self-acting or self-pressurizing bearings, commonly referred to as hydrodynamic bearings. Hydrostatic bearings receive a constant flow of lubricant under pressure from an external lubricant source which generates the required lubricating film pressure in the bearing. In hydrodynamic bearings, on the other hand, the required lubricating film pressure is generated by the relative movement of the bearing surfaces. Hydrodynamic bearings, however, may be supplied with a constant flow of lubricant from an external source to maintain a sufficient quantity of lubricant in the bearing or to cool the bearing.

A general object of the present invention is to provide improved hydrodynamic rotary bearings.

Hydrodynamic journal or radial bearings are well-known in the art and are particularly adapted to high rotary speed applications. As a matter of fact, the rotational speeds of some rotary machines are so high as to preclude the use of radial bearings other than hydrostatic or hydrodynamic bearings. If, in addition, it is impractical or impossible to provide the required external pressurized lubricant supply for a hydrostatic bearing, as is often the case, the bearing choice is further narrowed to hydrodynamic bearings alone. Hydrodynamic radial bearings, therefore, are becoming increasingly important in the bearing art.

At this point, attention is directed to the fact that both hydrostatic and hydrodynamic bearings may be designed to use either a liquid or a gaseous lubricant. Air, for example, is commonly used as a lubricant in both hydrostatic and hydrodynamic gas bearings. For simplicity, the present invention is disclosed herein primarily in connection with the use of a gaseous lubricant, such as air or other suitable gas. As will be seen later, however, the improved hydrodynamic bearings of the invention may be designed for use with liquid as well as gaseous lubricants.

Various hydrodynamic radial bearing configurations are presently available. Unfortunately, however, these existing hydrodynamic bearings, while satisfactory for various applications, possess certain inherent deficiencies which detract from their usefulness and even preclude their use in many present day, ultra-high speed, rotary machines. The deficiencies referred to here involve the extremely high degree of accuracy and precision with which the existing hydrodynamic radial bearings must be machined, the inherent hydrodynamic instability of these bearings, and various other related characteristics thereof.

Actually, the existing hydrodynamic bearing configurations, including radial bearings, thrust bearings, and slider bearings, have been studied, tested, and analyzed in such great detail that the above-stated deficiencies are well-known to and understood by those skilled in the art. Nevertheless, since the present invention is so intimately involved with such deficiencies, it is thought desirable to consider the latter briefly at this point, as they apply to hydrodynamic radial bearings, in the interest of a more thorough understanding of the present invention.

To this end, consider a simple fixed geometry, hydrodynamic radial bearing system comprising a rotor or shaft and a bushing in which the shaft turns. As the shaft is accelerated from rest, the gas between the shaft and bushing is subjected to a shear action; that is to say, the boundary layer of gas adjacent to the bushing tends to remain stationary because of the friction between the bushing surface and the gas while the boundary layer of gas adjacent the shaft tends to rotate with the latter because of the friction between the gas and the shaft surface. Every physical shaft, of course, is subjected to radial loading. Such loading may include, for example, the weight of the shaft, in those cases where the shaft axis is other than vertical, centrifugal force acting on the inherent shaft unbalance, asymmetrical driving forces on the shaft, gyroscopic forces, in those cases where the shaft is subjected to attitude changes, acceleration and deceleration forces, and so on.

This radial loading on the shaft causes the latter to assume an eccentric position in the bushing, whereby the annular clearance space between the shaft and bushing is restricted at the position of closest approach of the shaft to the bushing. The opposing surfaces of the shaft and bushing converge as they approach this restriction in the direction of shaft rotation and diverge as they receded from the opposite side of the restriction. Accordingly, a wedge-shaped convergent zone exists between the shaft and bushing surfaces immediately ahead of the restriction and a divergent zone exists immediately behind the restriction. Owing to the internal friction of the gas in the bushing and the friction between the gas and shaft, rotation of the latter wipes or drives the gas into the convergent zone, thereby creating a relatively high pressure area in the latter zone and a relatively low pressure area in the divergent zone. Accordingly, gas tends to leak or squeeze between the shaft and bushing from the high pressure, convergent zone to the low pressure, divergent zone and thereby create a film between the shaft and bushing. As the shaft continues to accelerate, the gas pressure eventally becomes sufficient to lift or displace the shaft from the bushing, thereby creating a hydrodynamic film between the bushing and shaft which rotatably supports the latter. The gas then commences to rotate or whirl around the clearance space between the bushing and shaft with an average rotational speed which is approximately one half the rotational speed of the shaft. At this time, the net transport of gas into the restriction between the shaft and bushing is sufficient to maintain the hydrodynamic film pressure required to support the shaft.

During the initial acceleration of the shaft, the latter tends to rotate on its geometric axis, and centrifugal force acting on the inherent eccentric mass of the shaft causes the latter to orbit or whirl in the bushing at synchronous speed, that is at a rotational speed equal to the rotational speed of the shaft on its axis. This orbiting or whirling motion is commonly referred to as synchronous whirl and may involve either or both the cylindrical mode and conical mode. The amplitude of the synchronous whirl increases as the shaft speed approaches its lowest critical speed. In some hydrodynamic radial bearings, maximum shaft speed is limited by synchronous whirl.

Synchronous whirl, however, does not limit maximum shaft speed in all existing hydrodynamic radial bearings, particularly if the lowest critical speed is passed through rapidly. For example, since the amplitude of synchronous whirl becomes maximum at a relatively slow shaft speed, i.e., as the shaft approaches its lowest critical speed, a bearing may not incur damage even though synchronous whirl causes contact of the shaft with the bushing. Moreover, the hydrodynamic film remains effective and imposes a non-linear damping and cushioning action on the shaft which resists contact of the latter with the bushing. In addition, many of the existing bearings are stepped, or provided with extremely small clearances to increase film stiffness, or equipped with means to exert a radial stabilizing load on the shaft, or are otherwise constructed to avoid failure due to synchronous whirl. Once the lowest critical speed is exceeded, the shaft tends to rotate on its mass axis, so that while the shaft continues to exhibit a synchronous whirl, the latter does not pose any further problem.

If the shaft speed of the existing radial bearings continues to increase, however, the bearings exhibit a much more serious form of instability as the shaft approaches a speed approximately twice its lowest critical shaft speed. This instability is known by various names but is most commonly referred to as half frequency, or half-speed whirl instability. Half-speed whirl instability results from the fact that as the shaft approaches a speed approximately equal to twice its lowest critical speed it inherently tends to undergo harmonic vibration or whirl at its lowest critical frequency. This harmonic vibration is superimposed on the synchronous shaft whirl and is stimulated or excited by the pressure of the half-speed, rotating hydrodynamic film whose average velocity then approaches the latter critical frequency. As a result the excursions of the shaft rapidly increase in amplitude and the shaft approaches the bushing. During such half-speed whirl of the shaft, its whirl velocity approximates the average velocity of the fluid film. When this occurs, film support is lost with respect to the half-speed orbiting of the shaft. The end result of the rapid increase in amplitude of the shaft excursions and the loss of hydrodynamic film pressure is direct contact of the rotating shaft with the bushing. This, then, is half-speed whirl instability. Since contact of the shaft with the bushing occurs at relatively high shaft speed, the existing gas lubricate hydronamic radial bearings almost invariably fall due to such half-speed whirl instability.

Various hydrodynamic radial bearing configurations have been devised in the past to reduce half-speed whirl instability and to increase the maximum safe shaft speed. While some of these bearing configurations have been successful to a limited extent, they are, in general, complex, costly to make, and, at best, do not permit shaft speeds of the order of those permitted by the hydrodynamic radial bearing configurations of this invention.

While the foregoing discussion has concerned itself primarily with gas bearings, it will become evident as the description proceeds that the invention can be applied to both gas-lubricated and liquid-lubricated bearings.

A more specific object of the invention, therefore, is to provide improved hydrodynamic bearings which avoid the above noted and other deficiencies of the existing hydrodynamic bearings.

An object of prime importance is to provide improved hydrodynamic bearings wherein the shaft or rotor is resiliently supported by compliant bearing surfaces which act in a highly unique and novel way to materially reduce or entirely eliminate bearing failure due to half-speed whirl instability.

A further object of the invention is to provide improved hydrodynamic radial bearings which are characterized by their simplicity of construction, economy of manufacture, ability to accommodate bearing misalignment, non-linear elastic damping properties, relatively large clearances and resulting relatively large manufacturing tolerances, dirt resistance, ease of repair, and various other unique features of construction and operation, whereby the bearings are ideally suited to their intended purposes.

Other objects, advantages, and features of the invention will become apparent to those skilled in the art as the description proceeds.

Briefly, the objects of the invention are attained by providing hydrodynamic bearings which may be considered broadly as improvements on the so-called "foil bearings" of the prior art. In the present hydrodynamic bearings, the shaft is rotatably supported by bearing means which provide a plurality of separate bearing surfaces spaced around the shaft and each extending generally circumferentially about a portion only of the shaft. At least one of these bearing surfaces is furnished by a resiliently compliant bearing element or foil. According to the preferred practice of the invention, the bearing surfaces are three in number and each is furnished by such a resiliently compliant bearing element or foil. During rotation of the shaft, the latter is supported by hydrodynamic films between the shaft and the compliant bearing foils. Being compliant, the bearing foils accommodate orbital excursions of the shaft as the shaft speed approaches and passes through its critical speeds.

In some forms of the invention, compliant yielding of the bearing foils is limited by a surrounding bearing housing or bushing, thereby to positively limit orbital excursions of the shaft.

In addition to accommodating and, in some cases, positively limiting shaft excursions, the hydrodynamic radial bearings of the invention exhibit certain unique actions which, although not fully understood, have been found to both materially reduce and prevent bearing failure due to half-speed whirl instability. Radial bearings constructed in accordance with the invention, for example, have been successfully operated at speeds of the order of 300,000 to 600,000 r.p.m.

At this point, attention is directed to the fact that by the expression "bearing foil," as used herein, is meant, essentially, a thin flexible film lubricated bearing element or strip whose thickness relative to its other dimensions is such that it will be locally deflected by the hydrodynamic film forces between the shaft and foil. In this regard, for example, the bearing foils of this invention differ from a resiliently supported shoe bearing which is compliant only with respect to its support and is rigid with respect to its own geometry. Examples of suitable bearing materials are those embodied in the present illustrative embodiments of the invention. In some illustrative forms of the invention, for instance, the bearing foils comprise strips of plastic film or tape such as polyethylene terephthalate marketed under the trademark Mylar or other similar strip or tape materials which are stressed in tension to compliantly support the shaft. In other illustrative forms of the invention, the bearing foils comprise thin, flexible spring strips, or blades of steel or other metal which compliantly support the shaft by virtue of their inherent spring stiffness.

A better understanding of the invention may be had from the following detailed description of particular illustrative embodiments thereof taken in connection with the attached drawings, wherein:

FIG. 1 is an axial section through a turboexpander equipped with hydrodynamic radial shaft bearings according to the invention;

FIG. 2 is a section taken in line 2—2 in FIG. 1;

FIG. 3 is an enlarged transverse section through the rotor shaft in FIG. 1 illustrating portions of the compliant bearing elements or foils of one hydrodynamic bearing in the positions which the foils assume when the shaft is at rest;

FIG. 4 is a section similar to FIG. 3 showing the bearing foils in the positions they assume when the shaft is rotating at a speed sufficient to generate hydrodynamic lubricating films between the shaft and foils;

FIG. 5 is a section similar to FIG. 4 illustrating the manner in which the bearing foils yield to accommodate orbital excursions of the shaft;

FIG. 6 is an axial section through a turboexpander equipped with modified hydrodynamic radial shaft bearings according to the invention;

FIG. 7 is a section taken on line 7—7 in FIG. 6;

FIG. 8 is a section through a further modified radial shaft bearing according to the invention;

FIG. 9 is a section taken on line 9—9 in FIG. 8;

FIG. 10 is an end view of yet a further modified radial shaft bearing according to the invention;

FIG. 11 is a side elevation of the bearing in FIG. 10;

FIG. 15 is a partial view of a still further modified bearing according to the invention;

FIG. 16 is a view similar to FIG. 15 of a further slightly modified bearing according to the invention; and FIG. 17 illustrates a resilient cushion device embodied in the bearing of FIG. 16.

Figure 12:
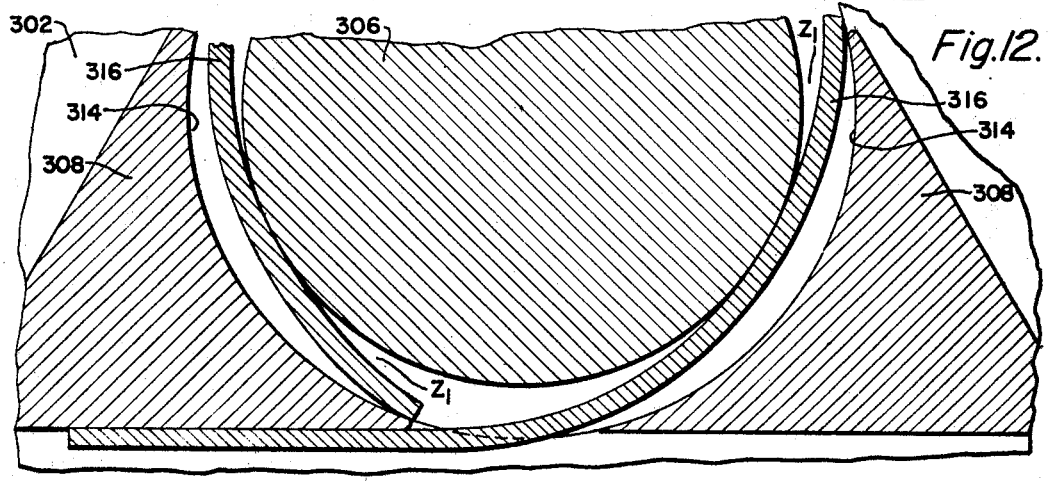
FIG. 12 is an enlargement of a portion of the bearing in FIG. 10 illustrating the bearing foils in the positions they assume when the shaft is at rest.

In FIGS. 1 through 5 of these drawings, numeral 20 denotes a small turboexpander of the kind used in cryogenic refrigeration systems. Turboexpander 20 comprises a housing 22 including circular end plates 24 and 26, a hollow cylindrical center section 28, bearing supports 30, and a disc 31. Bearing supports 30 have circular end plates or flanges 32 positioned between the center section 28 and the end plates 24, 26, respectively, of the housing and coaxial circular walls 34 slidably fitted in the ends of the center section. The housing assembly including the end plates 24, 26, center section 28, bearing supports 30, and disc 31, is held together by bolts 36 to form the turboexpander housing 22.

Coaxially positioned in the housing 22 is a rotor 38. Rotor 38 includes a circular shaft 40 which extends through aligned central openings 42 in the bearing support end plates 32 and the disc 31. One end of the shaft 40 is received in a coaxial recess 44 in the housing end plate 24. The opposite end of the shaft extends into an impeller chamber 46 defined by the disc 31 and a stepped bore 48 in the housing end plate 26. Fixed on the latter end of the shaft 40 is a turbine runner 50 of the radial inflow type. Rotor 38 is rotatably supported in the housing 22 by hydrodynamic journal or radial bearings 52 which constitute the principal subject matter of this invention and will be described in detail shortly. The rotor is axially restrained by a thrust bearing 54. This bearing may comprise any hydrodynamic thrust bearing or other kind of thrust bearing capable of axially supporting the rotor 38 when the latter is driven at the speeds contemplated in the invention. Since the thrust bearing 54 does not actually form a part of the present invention, the bearing has not been illustrated in detail. Suffice it to say that the bearing 54 shown comprises a housing 54a positioned between the opposing inner ends of the cylindrical walls 34 of the radial bearing supports 30 and a thrust flange 54b on the rotor shaft 40 which rotates in the housing 54a and is axially restrained by thrust bearing means (not shown) active between the housing 54a and the flange 54b. Copending application Ser. No. 294,387 filed July 11, 1963, entitled Hydrodynamic Shaft Bearing, and assigned to the assignee of this invention, discloses one thrust bearing configuration which is particularly suited for use in the illustrated turboexpander.

Within the impeller chamber 46 is a sleeve 56 which seats at one end against the housing disc 31 and at the other end against the bottom wall 58 of housing end plate bore 48. Disc 31 and sleeve 56 define, with the wall of the stepped portion of bore 48, an annular manifold passage 60 about the turbine impeller 50. Passage 60 opens radially inward to the impeller through ports 62 in the sleeve 56. Communicating with the manifold passage 60 is an inlet passage 64, the outer end of which terminates in an inlet 66 adapted for connection to a fluid system (not shown) containing the pressure fluid to be expanded in the turboexpander 20. Leading axially from the impeller chamber 46 is an exhaust passage 68 through which the expanded fluid exhausts from the expander back to the system. Seals 70 are provided to prevent fluid leakage between the impeller 58 and the sleeve 56.

During operation of the turboexpander 20, the rotor 38 is driven in rotation by the action of the pressure fluid entering through the inlet 66. The fluid expands through the impeller, in the well-known way, and is thereby cooled, the small friction of the turbine providing the required load for cooling. It is to be understood, of course, that the turboexpander described above is intended to merely illustrate one of the uses of the present hydrodynamic bearings and that the latter are capable of general application in any device requiring hydrodynamic bearings.

Proceeding now to the subject matter of the present invention, namely the radial bearings 52, each of the latter will be seen to comprise a multiplicity of supporting posts 72 arranged with their axes parallel to and uniformly spaced about the rotor 38 at a uniform radial distance from its axis of rotation. These posts are disposed in close peripheral proximity to one another, and each post is peripherally recessed, as may be best observed, in FIG. 1. Indicated at 74 are three thin, flexible, resiliently compliant bearing elements or foils which actually rotatably support the rotor. These bearing strips may comprise any suitable material although Mylar film or tape has been found to be uniquely adapted to the purpose and is preferred. The bearing foils 74 are threaded between alternate adjacent pairs of posts 72, as shown, so that the center portions 74a of the foils define an equilateral triangle within the central shaft space surrounded by the posts. The rotor shaft 40 passes through this triangle. The ends of the bearing foils pass through slits 76 in the cylindrical wall 34 of the respective bearing support 30 and are folded against and secured to the outer surface of this wall, as shown. The ends of the foils may be secured to the bearing support wall 34 in any convenient way, such as by adhesively bonding the ends to the wall.

When the foils of each bearing 52 are thus secured to their respective bearing support 30 the foils are stretched. As a consequence, the center portions 74a of the foils are stressed in tension in the completed bearings. The bearing posts 72 are so proportioned relative to the diameter of the rotor shaft 40 that the normal distance from the rotor axis to the center portion 74a of each foil, prior to insertion of the shaft into the bearings, is slightly less than the radius of the rotor shaft. Accordingly, when the rotor is inserted through the bearings, the bearing foils bow outwardly slightly and thereby wrap partially about the rotor shaft, as shown. It is evident that the bearing foils, being under tension, support the shaft coaxially in the turbine housing 22.

The operation of the present improved hydrodynamic radial bearings 52 will now be discussed with reference, primarily, to FIGS. 3 through 5. This discussion is patterned after the earlier discussion of the existing hydrodynamic radial bearings in order to more clearly point up the advantages of the present bearing over the existing bearings.

At this point, attention is directed to the fact that in FIGS. 3 through 5, only the shaft 40 and the central portions 74a of the bearing foils 74 of one radial bearing 52 are shown, on enlarged scale, and the clearances, hydrodynamic film thicknesses, and shaft displacements have been exaggerated for the sake of clearer illustration.

It is evident that when the rotor 38 is stationary, with the turboexpander 20 horizontally positioned, as in FIG. 2, the rotor shaft 40 will rest on and be supported entirely by the lower bearing foil 74 in FIGS. 2 and 3, this foil, as well as the other bearing foils 74 being tensioned, as discussed earlier, so that they are capable of thus supporting the shaft. Since the weight of the rotor is supported by the lower foil 74 in FIGS. 2 and 3, this foil is slightly more bowed, at this time, than the remaining two bearing foils. The tension in the latter foils, however, retains the latter in contact with the shaft 40 so that these foils are also slightly bowed, as shown. Each bearing foil, then, wraps partially around the shaft, thereby cradling the latter for rotation.

Assume now that pressure fluid is delivered to the inlet 66 of the turboexpander to drive the shaft 40 in rotation. Some of this gas leaks into the housing space containing the bearings 52 so that the latter, in effect, run submerged in the gas. If the bearing space is not hermetically sealed, a constant flow of gas will occur through the bearings to cool the latter, as is usual in the hydrodynamic bearing art. The present bearings will run in any gas, including air. In some cases, of course, a shaft seal may be placed between the impeller chamber 46 and the bearing space and a gas, different than that delivered to the turbine, may be supplied to the bearing space. For example, the bearing space might simply be open to the atmosphere, whereby the gas in which the bearings run would be air.

As the shaft 40 accelerates from rest, the gas between the shaft and the bearing foils 74 is subjected to a shear force, the gas adjacent the foils tending to remain stationary, because of the friction between the gas and foils, and the gas adjacent the shaft tending to rotate with the latter because of the friction between the gas and shaft. Initially, however, there will be no hydrodynamic films between the shaft 40 and the bearing foils 74 so that when the shaft starts to rotate, it directly contacts and is rotatably supported by the bearing foils, as shown in FIG. 3. Accordingly, at this time, the bearing foils furnish bearing surfaces for the shaft. In contrast to fixed geometry hydrodynamic bearings, of course, shaft 40 initially has surface contact, rather than line contact, with the inner bearing surface of each bearing foil. Also, there are three convergent zones $Z_1$, and three divergent zones $Z_2$, preceding and following the positions of closest approach of the shaft to the foils, in contrast to the single convergent zone and single divergent zone in a fixed geometry bearing.

During rotation of the shaft 40 in the direction indicated, then, the gas surrounding the shaft is wiped or transported into each of the convergent zones $Z_1$ and from each of the divergent zones $Z_2$, thereby creating a high pressure area in each zone $Z_1$ and a low pressure area in each zone $Z_2$ so that gas tends to leak from each zone $Z_1$ to the adjacent zone $Z_2$. Continued acceleration of the shaft eventually increases the gas pressure in the convergent zones $Z_1$ sufficiently to deflect the bearing foils outwardly, away from the shaft, thereby creating hydrodynamic bearing films $f$ between the shaft and bearing foils, as shown in FIG. 4. These films then support the shaft for substantially frictionless rotation. The films $f$ are of substantially uniform thickness, as illustrated, and the film pressure is substantially constant along the length of each film.

At this point, attention is directed to one advantage of the present hydrodynamic bearing. Since the bearing foils 74 are compliant and the hydrodynamically generated film pressures on the shaft are substantially in balance, such pressures tend to displace the bearing foils from the shaft rather than shaft from the bearing foils. When the hydrodynamic bearing films $f$ develop, the gas commences to rotate or whirl through the clearance space between the shaft and each foil at an average velocity approximating one half the shaft speed. The net transport of gas into the convergent zones $Z_1$ is sufficient to maintain the hydrodynamic film pressure required to support the shaft.

During initial acceleration of the rotor 38, the latter tends to rotate on its geometric axis, and centrifugal force acting on the inherent eccentric mass of the rotor causes the latter to undergo synchronous whirl. A second advantage of the present hydrodynamic bearing over the conventional fixed geometry bearing resides in the fact that the bearing foils 74, being compliant, yield to accommodate such synchronous whirl, whereby the possibility of bearing failure due to synchronous whirl is eliminated. Moreover, the bearing foils, by virtue of their tension, and the hydrodynamic films cushion and dampen, and thereby reduce the amplitude of synchronous whirl. In this regard, attention is directed to FIG. 5 wherein the solid lines illustrate the shaft and foils at one instant during whirling or orbiting of the shaft, which, at this point, can be considered as synchronous whirl, and the dotted lines illustrate the shaft and foils at a subsequent instant, such that the direction of orbit is in the direction of shaft rotation, as shown. As the shaft orbits toward a bearing foil 74, or toward the converging ends of two adjacent foils, the pressure of the hydrodynamic film between the shaft and the foil approached tends to increase, thereby displacing the foil outwardly, as shown, against the tension of the foil. Thus as the shaft orbits toward each foil in succession during its orbital progression around the bearing axis, the foil being approached yields outwardly to accommodate such orbital motion and, at the same time, maintain the proper film pressure and thickness. As the shaft recedes from a bearing foil, on the other hand, the film pressure between that foil and the shaft tends to decrease so that the tension in the foil pulls the latter in toward the shaft to maintain the film thickness and pressure. Thus, each foil moves in and out so as to, in effect, follow the shaft as the latter orbits about the bearing axis, and thereby maintain a uniform hydrodynamic film thickness and pressure around the shaft.

At this point, then, it is important to note that because of the compliancy of the bearing foils, the hydrodynamic films between the shaft and foils remain intact and effective to rotatably support the shaft as the latter orbits. Both the films and the foils cushion and dampen orbital motions of the shaft. Some film squeeze, of course, does occur between the orbiting shaft and each foil as it is approached by the shaft. Since the foils can yield, however, such film squeeze is small. This is in contrast to a fixed geometry bearing in which the outer supporting surface for the hydrodynamic film, i.e., the bushing, is rigid and non-compliant, whereby excursions of the orbiting shaft, even during synchronous whirl, may squeeze the film sufficiently to produce contact of the shaft with the bushing.

It is obvious, of course, that the present compliant bearing foils 74 will accommodate both the cylindrical and conical modes of synchronous whirl. As noted earlier, the amplitude of synchronous whirl becomes maximum as the rotor 38 passes through its lowest critical speed and when this speed is exceeded, the shaft commences rotation on its mass axis whereby synchronous whirl, while it continues, is no further problem.

Here, a further advantage of the present hydrodynamic bearing over the fixed geometry radial bearing should be considered. As is well-known in the art, the natural or resonant frequency of a rotor supported in a hydrodynamic bearing, and its harmonic frequencies or speeds, are dependent on several factors including rotor stiffness and mass, the spring rate of the hydrodynamic film or the spring rate of the bearing. For example, in the case of a rotor of given mass, stiffness, etc. turning in a hydrodynamic bearing, the lowest or fundamental resonant speed of the shaft is dependent primarily on, and is directly related to, the ratio of the spring rate of the bearing to the rotor mass. So it is that the lowest resonant or critical speed of a rotor turning in a fixed geometry hydrodynamic bearing, wherein the bushing is rigid and thus has an exceedingly high spring rate, is, in fact, relatively high, at least compared to the lowest critical speed of the same rotor turning in the present bearing.

The spring rate of the present bearing which determines the lowest critical speed, for example, is the spring rate of the bearing foils 74. Since the spring rate of these foils, and therefore the ratio of foil spring rate to rotor mass, is very low, the lowest critical rotor frequency is low. As a result, when the rotor 38 is accelerated from rest, as described above, the lowest critical speed is passed through early, at a relatively low shaft speed. Synchronous whirl of the shaft at this low critical speed is of relatively small amplitude. Accordingly, even though the excursions of the shaft during such whirl should carry the shaft into contact with the bearing foils 74, the possibility of damage is minimized, or eliminated, because of the relatively slow speed at which the shaft is then turning.

As the shaft 40 continues to accelerate above its lowest critical speed, the speed of the shaft approaches a speed equal to twice the lowest critical speed at which failure occurs in fixed geometry bearings and other existing hydrodynamic bearings due to half-speed whirl instability. As noted earlier, the present bearing configurations both minimize, or eliminate half-speed whirl instability and successfully avoid bearing failure from any half-speed whirl instability that does exist. The exact manner in which the present bearings operate to accomplish this is not known at the present. The success of the bearings, however, has been demonstrated by operation of bearings constructed in accordance with the invention for extended periods of time at shaft speeds on the order of 300,000 to 600,000 r.p.m. Discussed below are some of the actions and phenomena which are either known to occur or are thought to occur and which appear to contribute to the success of the present bearings.

From the earlier discussion of fixed geometry bearings, it will be recalled that half-speed whirl instability occurs as a result of excitation of the shaft into resonant vibration or whirl at the lowest critical shaft speed by the hydrodynamic film pressure and the other forces active on the shaft as the latter approaches a speed about twice its lowest critical speed. Bearing failure occurs when the orbiting velocity of the half-speed shaft whirl approximates the average velocity of the rotating fluid film, which results in loss of hydrodynamic film support with respect to the half-speed shaft orbital motion and contact of the rapidly rotating shaft with the bushing. In other words, for half-speed whirl instability and bearing failure to occur, it is necessary (1) that the hydrodynamic film pressure and other forces active on the shaft excite the latter into a resonant whip, or whirl or vibration at the lowest critical speed of the shaft when the latter is rotating at about twice that speed, and (2) that the shaft undergo a half-speed orbital motion relative to the outer boundary surface of the hydrodynamic film.

With regard to (1) above, it is evident from what has been said thus far about the action of the bearing foils in the present bearing and from FIGS. 4 and 5 that even though the shaft 40 orbits in the bearings 52, as a result of rotation of the shaft about its mass axis when the shaft speed exceeds the lowest critical speed, the hydrodynamic film thickness remains substantially uniform around the shaft; that is, as the shaft orbits, the foils move in and out, as explained above, to maintain the three films $f$ substantially uniform in thickness and pressure. As a consequence, the shaft is, in effect, constantly centered with respect to the bearing foils 74. This results in an appreciable reduction in the tendency of the rotating films $f$ to excite resonant vibration or whirl of the shaft when the latter approaches twice resonant speed. Moreover, the tension in the bearing foils, as well as the inward and outward movement of the foils resulting from the orbital motion of the shaft, produce damping of such orbital motion. Accordingly, the tendency of the shaft to break into a resonant whip as the shaft speed approaches twice the lowest critical speed is reduced.

With regard to (2) above, it is evident that since the bearing foils 74 move in and out with the shaft as the latter orbits, the primary cause of failure of fixed geometry bearings, to wit, orbiting of the shaft relative to the outer boundary (i.e., the bearing foils) of the hydrodynamic films at the average velocity of the films, is eliminated. Thus, because the bearing foils move in and out with the orbiting shaft, the distance between the shaft and foils, and the hydrodynamic film thicknesses, remain generally constant, whereby the shaft, in effect, undergoes no orbital motion relative to the foils. Moreover, there is no continuous annular clearance space about the shaft 40 as there is in a fixed geometry bearing. In the event that a reduction in the pressure of any of the hydrodynamic films $f$ should occur, the adjacent bearing foil 74 is immediately pulled inwardly toward the shaft 40, by the foil tension, thereby decreasing the clearance between the shaft and foil. This, of course, immediately restricts gas flow between the shaft and foil and thus restores the film pressure, so that no loss of hydrodynamic film support can occur as in fixed geometry bearings.

It has been found by actual experiment that the above actions of the bearing foils 74, as well as other actions which are not yet fully understood, and possibly yet other actions which have not yet been observed, effectively reduce or entirely eliminate, half-speed whirl instability in the present bearing and prevent bearing failure due to any half-speed whirl instability which does exist. Another factor which aids in preventing bearing failure, of course, is that even though the excursions of the shaft 40 drive the latter into contact with one of the bearing foils 74, the tendency for bearing damage to occur is much less than in a fixed geometry bearing because of the compliancy of the foils in contrast to the rigidity of the bushing of a fixed geometry bearing.

As the shaft is accelerated above twice its lowest critical speed, of course, other critical speeds are encountered, such as the speed at which the bearing foils 74 commence resonant vibration. Since the ratio of the foil spring rate to foil mass is very high, however, the critical speed is very high. In fact this latter critical speed is so high that it poses no problem in many applications. This matter of foil vibration will be discussed again later, however.

Reference is now made to FIGS. 6 and 7 illustrating a turboexpander 100 embodying modified hydrodynamic radial bearings 102 according to the invention. Turbine 100 comprises a housing 104 which is generally similar to the housing of the turbine just described and includes end plates 106 and 108 and a center hollow cylindrical section 110 held together by bolts 112. Within the housing is a rotor 114 which is identical to the rotor in the earlier turbine. Rotor 114 is restrained in the axial direction by a thrust bearing 116 identical to that described previously. Pressure fluid entering the turbine through the inlet 118 expands through the rotor impeller 120, thereby driving the impeller in rotation, and exhausts from the turbine through its exhaust passage 122, as before.

Bearings 102 include annular bearing supports 124 having end plates or flanges 126 which are clamped between the housing end plates 106, 108 and the housing center section 110, and end plates 128 which are fitted in the ends of the center section and joined to the respective bearing support end plates 126 by three uniformly spaced posts 130. The posts 130 are preferably formed by initially machining each bearing support 124 so that its end plates 126, 128 are joined by a sleeve and then milling away this sleeve to form the posts 130. Securely anchored at one end to each post 130, as by cementing, is a thin flexible compliant bearing strip or foil 132 which may be made of the same material as the bearing foils in the earlier described hydrodynamic radial bearings. Each bearing foil 132 extends from its respective anchoring post 130 to the adjacent post, in the clockwise direction of the rotor shaft 137, as the latter is viewed in FIG. 7, then part way around the adjacent post, and finally out toward the periphery of the respective bearing support end plate 128.

Between the end plates 126, 128 of each bearing support 124 are three arcuate, generally uniformly spaced and circumferentially extending spring leaves 134. Corresponding ends of these spring leaves are anchored to pins 136 extending between the bearing support end plates 126, 128 so that the leaves form cantilever springs which extend counterclockwise about the rotor shaft 137. The outer end of each bearing foil 132 is wrapped around and bonded or otherwise firmly secured to the free end of a spring 134, as shown. From this description, it is evident that the springs 134 are effective to tension the bearing foils 132.

The anchor posts 130 of each bearing 102, being uniformly spaced as they are, define an equilateral triangle whose sides are formed by the center portions 132a of the bearing foils 132. The posts 130 are located at such a radial distance from the axis of the rotor 114 that the normal distance from the axis to each of the bearing foil center portions 132a is slightly less than the radius of the rotor shaft 137. Accordingly, each foil wraps partially around the shaft and is thereby slightly bowed, as shown. It is evident, therefore, that the bearing foils 132 rotatably support the rotor shaft 137 in essentially the same way as do the bearing foils in the radial bearings 52 described earlier. The radial bearings 102, of course, are superior to the earlier radial bearings 52 since the springs 134 in the bearings 102 are effective to maintain the proper tension in the bearing foils. If the bearing foils in the radial bearings 52 become slack, one end of the foil must be detached from the bearing support, pulled until the desired tension is re-established in the foil, then reattached to the supports. The latter bearings, on the other hand, are more simple and less costly to make than the radial bearings 102.

It is desirable that the springs 134 in the bearings 102 be adjustable to permit adjustment of the tension in each bearing foil 132 and to permit the tension in the several foils to be equalized. To this end, the illustrated bearings 102 are equipped with adjustment screws 138, one for each spring. Each screw 138 is radially threaded in the housing center section 110 and seats at its inner end against its respective spring 134, approximately midway between the ends thereof. Jam nuts 140 retain the screws in adjusted position. It is evident, therefore, that the tension in the bearing foils 132 may be adjusted, as described, by adjustment of the screws 138.

When the rotor 114 is driven in rotation, hydrodynamic, gas lubricating films are generated between the bearing foils 132 and the rotor shaft 137 at the positions of closest approach of the shaft to the foils, and the foils act in substantially the same way as described earlier in connection with the hydrodynamic radial bearings 52. In the case of the bearings 102, however, the foil springs 134 introduce an additional spring rate and spring damping into the bearings which aid in limiting the orbital excursions of the rotor 114 as the latter passes through its critical speeds. The bearings 102, of course, like the earlier bearings 52, are effective to minimize and prevent failure due to half frequency whirl instability for the reasons discussed earlier.

In both of the radial bearings 52 and 102 discussed thus far, orbital excursions of the rotor are limited only by the tension in the bearing foils. The modified hydrodynamic radial bearing 200 of FIGS. 8 and 9 positively limits rotor excursions. In the interest of simplicity, the bearing 200, as well as the bearings described later, are shown by themselves rather than in combination with a turbine or other rotary device, as were the bearings described earlier. It is evident, of course, that the bearing 200, and the bearings described later, may be used in a turbine of the kind shown in FIGS. 1 and 6 or in any other rotary device, or as simple shaft bearings.

Radial bearing 200 comprises an outer housing or bushing 202 through which extends the rotor or shaft 204 to be rotatably supported. In this form of the invention, the diameter of the bore 206 in the bushing 202 is in the order of 0.007 inch larger than the diameter of the shaft 204 so that a radial clearance on the order of 0.0035 inch exists between the bushing and shaft. The bushing has three uniformly spaced, axial slots 208 at each end which preferably though not necessarily open through the ends of the bushing, as shown.

Disposed between the bushing 202 and shaft 204, at each end of the bushing, are three bearing strips or foils 210. The ends of these foils extend through the bushing slots 208 and are then folded against and bonded or otherwise secured to the outer surface of the bushing. Each slot receives the adjacent ends of two foils, as shown. Bearing foils 210 are made of the same material as the bearing foils in the earlier forms of the present hydrodynamic radial bearings, and, when secured in position in the bushing, are stretched in a manner similar to the bearing foils in the radial bearings 52 of FIGS. 1 through 5. Accordingly, the bearing foils 210 in FIGS. 8 and 9 are under tension and rotatably support the shaft 204 in much the same way as the shafts are supported in the earlier described radial bearings.

It will be noted, however, that in the bearing 200, a greater wrap-around of the bearing foils about the shaft, and, thereby, greater shaft restraint, is achieved. The thickness of the bearing foils 210 is on the order of 0.001 inch, so that if the shaft is exactly centered in the bushing, a clearance in the order of 0.0025 inch exists between the outer surface of each foil, at its center, and the inner surface of the bushing. Thus the shaft is capable of limited lateral movement in the bushing. These clearances have been exaggerated for clarity in FIG. 8.

When the shaft 204 is driven in rotation, hydrodynamic gas lubricating films are generated between the shaft and each bearing foil 210 and the bearing foils act in precisely the same way as described earlier in connection with the radial bearings of FIGS. 1 through 5. Thus, the bearing foils 210 minimize, and prevent bearing failure due to, half frequency whirl instability as do the bearing foils in the earlier bearings.

Radial bearing 200 of FIGS. 8 and 9, however, has one distinct advantage over the earlier radial bearings. This advantage resides in the fact that the orbital excursions of the shaft which occur as the shaft passes through its critical speeds are positively limited by the bushing 202. This is important, of course, where the clearances between other parts of the rotary device in which the bearing is installed require the shaft excursions to be limited to a given maximum to avoid rubbing contact between the stationary and rotating parts.

An additional advantage of the radial bearing configuration of FIGS. 8 and 9 is that the static gas film which exists between each bearing foil 210 and the inner surface of the bushing 202 apparently creates a nonlinear pneumatic damping action and a squeeze film cushioning action that inhibit, or aid in damping, vibrational excursions of the shaft. It is thought that such pneumatic damping and squeeze film actions may also prevent bearing failure when a foil is thrust toward the bushing 202 by vibrational excursions of the shaft 204. For example, although the action is not fully understood, it appears that the rapid oscillation or vibration of the bearing fails which occurs due to orbital motion of the shaft, first as the latter undergoes synchronous whirl rotating on its geometric axis below the lowest critical speed and later as the shaft rotates on its mass axis above this critical speed, creates a pneumatic pumping action which increases the static gas pressure and thereby film stiffness behind the foils. This increased film pressure apparently imposes effective damping on the vibrational excursions of the shaft. It also, apparently, cushions direct contact of the foils with the bushing with a spring rate which rapidly increases, non-linearly, as the static gas films behind the foils are squeezed by thrusting of the latter toward the bushing.

It is obvious from the preceding discussion that even though orbital excursions of the shaft are limited in the radial bearing configuration of FIGS. 8 and 9, it is primarily the tension in the bearing foils 210 which restrains the shaft against lateral movement. Accordingly, in each of the present radial hydrodynamic bearing configurations described thus far, the bearing foils must be under substantial tension to properly support the shaft. It has been found that while such tensioned foil bearings are completely suitable for some applications, they do not possess sufficient stiffness for other applications involving greater radial loading of the shaft and greater vibrational forces and are otherwise less desirable than the bearing foils now to be discussed.

The radial hydrodynamic bearing configurations illustrated in FIGS. 10 through 17 and now to be described have been devised to avoid the above-noted disadvantages of these tensioned foil bearings.

Referring first to FIGS. 10 through 14, the radial hydrodynamic bearing 300 illustrated comprises a housing or bushing 302 having an axial bore 304 through which extends the rotor or shaft 306 to be rotatably supported. In this bearing, the diameter of bore 304 is on the order of 0.007 inch larger than the diameter of the shaft 306, so that when the shaft is centered in the bore, a radial clearance on the order of 0.0035 inch exists between the bushing 302 and the shaft. Each end of the bushing 302 is machined to the configuration of an equilateral triangle centered on the bushing axis and whose sides intersect the wall of bore 304. This machining operation forms, on each end of the bushing, three uniformly spaced, generally triangular bosses 308. Bosses 308 have side faces 310 disposed in common planes which define the sides of the equilateral triangle referred to above and intersect the bore 304, as shown. The bosses are thereby spaced by slots 312 which open radially to the bore 304. The bosses 308 have cylindric inner surfaces 314 which are continuations of the cylindrical surface of bore 304.

Positioned between the shaft 306 and the bushing surfaces 314 are thin, flexible, compliant bearing strips or foils 316. In this case, the bearing foils 316 comprise blades or leaves of spring steel or other suitable spring metal which inherently tend to spring back to their normal shape. One end of each bearing foil 316 seats against one face 310 of a boss 308 and is attached to the latter by bolts 318 or in some other convenient way. The opposite end of each bearing foil extends between the shaft 306 and the curved inner surface 314 of an adjacent boss 308. The three bearing foils at each end of the bushing 302 are secured to corresponding faces 310 of the bosses 308 and extend around the shaft 306 in a direction opposing the direction of rotation of the shaft. At this point, it should be noted that the illustrated extension of the foils around the shaft in a direction opposing the direction of shaft rotation is preferred, but not essential; thus, it has been found that with this direction of foil extension, the torque required to rotate the shaft from rest is less than that required when the foils extend in the direction of shaft rotation. Nevertheless, the foils may, if desired, extend in the direction of shaft rotation, or the shaft may rotate in both directions, i.e., its direction of rotation may be reversed so that at times, the foils will extend in the direction of shaft rotation and at other times in the opposite direction to shaft rotation.

As noted earlier, the bearing foils 316 comprise spring strips which inherently tend to spring back to their original, unstressed condition, which may be flat or slightly bowed. These strips are on the order of 0.001 inch thick. As a result, when the shaft 306 is at rest, each foil contacts the adjacent boss surface 314 at at least one position, i.e., at the free end of the foil, and contacts the shaft between its ends, as shown best in FIG. 12. It is evident, therefore, that the bearing foils tend to support the shaft 306 in a generally centered position in the bushing 302. Owing to the aforementioned dimensions of the radial clearance between the shaft and bushing and the foil thickness, each foil is normally spaced slightly from its opposing boss face 314 opposite the position where the foil contacts the shaft. The clearances have been exaggerated in the drawings for clarity.

Figure 13:
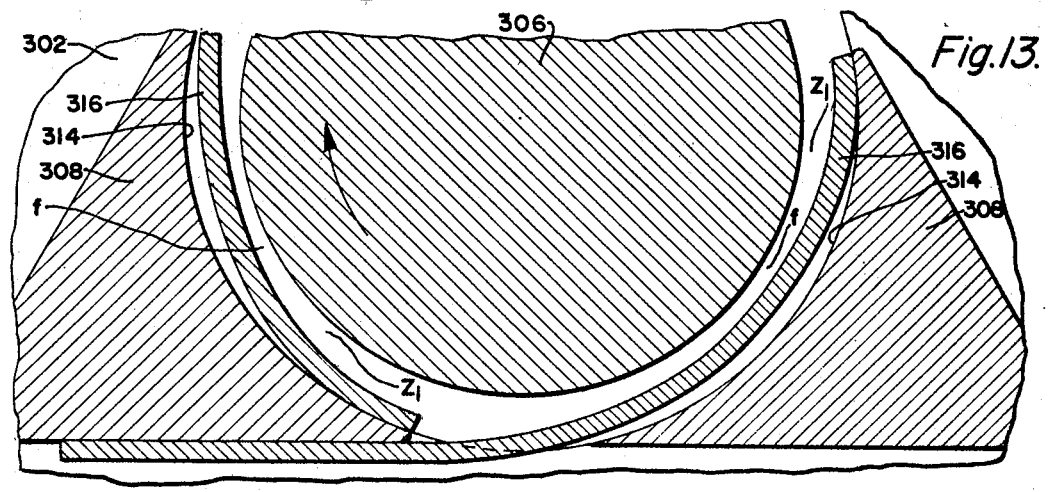
FIG. 13 is a view similar to FIG. 12 showing the bearing foils in the positions they assume when the shaft is rotating at a speed sufficient to generate hydrodynamic lubricating films between the shaft and foils.

When the shaft 306 is driven in rotation, hydrodynamic films are generated between the shaft and the bearing foils 316 in much the same way as described earlier in connection with the radial bearings of FIGS. 1 through 5. Thus, when the shaft is accelerated from rest, it initially engages, and is directly rotatably supported by the foils, as shown in FIG. 12. Attention is directed to the fact that while only one bearing foil 316 is shown in its entirety in FIG. 12, as well as in FIGS. 13 and 14, for the sake of clarity, the illustrated foil is typical of all of the foils. Rotation of the shaft wipes or transports gas into the convergent zones $Z_1$ between the shaft and bearing foils in the manner described before. As the shaft speed increases, therefore, the gas pressure in these zones increases and eventually becomes sufficient to separate the foils from the shaft, thereby creating hydrodynamic films $f$ between the shaft and foils, as shown in FIG. 13. The shaft is then rotatably supported by the films. As in the earlier forms of the invention, the hydrodynamic films $f$ tend to be of uniform thickness and pressure because of the flexibility of the foils. It is evident, of course, that when the bearing foils 316 separate from the shaft to create the hydrodynamic films $f$, the foils deflect or spring outwardly against their own inherent elasticity or resiliency.

Figure 14:
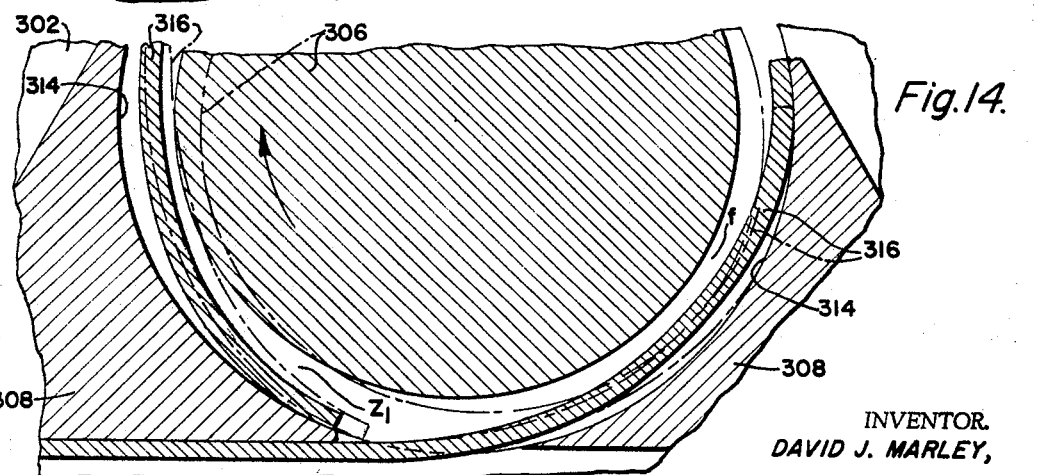
FIG. 14 is a view similar to FIG. 13 illustrating the manner in which the bearing foils yield to accommodate orbital excursions of the shaft.

Shaft 306 initially undergoes synchronous whirl owing to the inherent unbalance in the shaft, whereby the shaft orbits in the bushing 302, as depicted in FIG. 14. In the bearing under discussion, as in the earlier bearings, orbital movement of the shaft toward the bearing foils 316 in succession tends to increase the hydrodynamic film pressure between the shaft and the foil being approached. This increased film pressure deflects the approached bearing foil outwardly, as illustrated in dotted lines in FIG. 14, whereby the proper film thickness is maintained. As the orbiting shaft recedes from a bearing foil, on the other hand, the film pressure between the shaft and foil tends to decrease with the result that the spring tension in the foil causes the latter to spring inwardly toward the shaft, thereby again maintaining the proper film thickness and pressure. Thus the bearing foils 316 in the form of the invention under discussion accommodate synchronous whirl of the shaft, as do the bearing foils in the earlier forms of the invention. The bushing 302 positively limits the shaft excursions as does the bushing in the form of the invention illustrated in FIGS. 8 and 9.

The hydrodynamic bearing configuration of FIGS. 10 through 14 possesses the same advantage over the prior art fixed geometry bearings as the earlier described bearings of the invention that the lowest critical speed of the shaft is relatively low; that is to say, in the bearing of FIGS. 10 through 14, as in the earlier described bearings, the ratio of the spring rate of the bearing foils 316 to the mass of the shaft 306 and, therefore, the lowest resonant or critical shaft speed, are low. Accordingly, this lowest critical speed is encountered early in the acceleration of the shaft from rest, so that even though synchronous whirl of the shaft should thrust a bearing foil 316 into direct contact with the bushing 302, the bearing does not incur damage.

As the shaft 306 is accelerated above its lowest critical speed, the shaft speed approaches the more serious critical, i.e., twice the lowest critical speed, at which the existing radial hydrodynamic bearings fail due to half-speed whirl instability. The present bearing configuration of FIGS. 10 through 14, reduces or eliminates such half-speed whirl instability, and avoids bearing failure due to any half-speed whirl instability that does exist, for essentially the same reasons as discussed earlier in connection with the bearing of FIGS. 1 through 5. Thus, because the bearing foils 316 are compliant and move in and out as the shaft 306 orbits, thereby maintaining a generally uniform hydrodynamic film thickness around the shaft, the latter tends to be constantly centered with respect to foils. The tendency for the half-speed rotating hydrodynamic films to excite the shaft into a half-speed whirl or resonant orbital motion is thereby reduced. Also, as discussed more fully below, the bearing foils 316 and the static gas films therebehind impose non-linear mechanical and pneumatic spring damping on the shaft which inhibits half-speed resonant whirl thereof. Secondly, since the bearing foils move in and out with the shaft to maintain a generally uniform hydrodynamic film thickness around the shaft, as the latter orbits around its mass axis near twice critical speed, as illustrated in FIG. 14, any half-speed orbiting of the shaft which does occur is not relative to the bearing foils. Thus, such orbiting does not cause loss of film support as it does in the existing hydrodynamic radial bearings.

In the bearing of FIGS. 10 through 14, as in the earlier bearings of the invention, should any drop in hydrodynamic film pressure occur, such as would cause failure of the existing hydrodynamic bearings, the spring tension in the compliant bearing foils 316 causes the latter to immediately spring in toward the shaf 306, thereby restricting the clearance between the shaft and foils and restoring the film pressure to its proper value, in somewhat the same manner as discussed earlier in connection with FIGS. 1 through 5.

The bearing 300 of FIGS. 10 through 14, as thus far described, therefore, possesses the same advantages over the prior art hydrodynamic radial bearings as the earlier described bearings of the invention. The bearing configuration of FIGS. 10 through 14, however, is superior in certain respects to the earlier described bearing configurations.

In the first place, the bearing foils in the earlier bearings have no inherent spring stiffness or spring rate and restrain the shaft solely by virtue of the tension in the foils. As a result, the tensional stress in the foils must be subsantial and damping, in addition to that produced by the foils, is generally necessary. The spring strip bearing foils 316 in the bearing 300, on the other hand, have an inherent spring stiffness and a relatively high spring rate, and thus exert a greater restraint on the shaft than the tensioned bearing foils of the earlier bearings according to the invention. The bearing of FIGS. 10 through 14, therefore, has greater bearing stiffness and is capable of greater loading and can be used in a device with much smaller radial clearances than the earlier bearings. Attention is directed to FIG. 14 which illustrates a second unique advantage of the bearing foils 316 over the earlier bearing foils. In this figure, the solid lines illustrate the shaft 306 in one orbital position and the dotted lines illustrate the shaft in subsequent orbital position. It will be observed that as the shaft orbits from its solid line position to its doted line position, the resultant outward bowing or flexing of the approached bearing foil 316 increases the effective length of the free end of the foil in contact with the adjacent bushing surface 314 and thereby decreases the effective, unsupported length of the foil. This decrease in effective foil length, of course, occurs to each bearing foil in succession as the shaft orbits in the bushing. It is obvious that as the effective length of each foil is decreased in this way, its stiffness, i.e., spring rate, increases non-linearly. In other words, the spring rate of the bearing foils 316 increases non-linearly as the orbital motion of the shaft increases in amplitude. Moreover, as the foils bend in and out, their free ends frictionally rub against the inner bushing surfaces, thereby introducing an additional non-linearity into the spring action of the foils. The bearing foils 316 thereby produce non-linear elastic damping and cushioning of the shaft which resist both synchronous and half-speed resonant whirl thereof.

An additional highly important advantage of the bearing configuration of FIGS. 10 through 14 is that the bearing foils 316, because of their inherent spring stiffness and high spring rate, are very sensitive to variations in pressure of the hydrodynamic films $f$ and respond almost instantaneously to compensate for such pressure variations. Accordingly, should even a slight drop in hydrodynamic film pressure occur due to the onset of half-speed whirl instability, the bearing foils 316 instantaneously respond by springing toward the shaft to restrict the clearance between the foils and shaft and thereby restore the film pressure to its proper value. In this way, the bearing foils are effective to substantially reduce, if not entirely eliminate, half-speed whirl instability in the bearing.

The non-linear elastic damping and cushioning action of the bearing foils discussed above is aided by the non-linear damping characteristics of the hydrodynamic films $f$ as well as the squeeze film effect and the non-linear pnuematic damping and cushioning action introduced by the static gas films between the bearing foils and the inner bushing surfaces 314. Thus, in the bearing 300 under consideration, as in the bearing of FIGS. 8 and 9, it appears that the rapid vibration of the bearing foils 316 which occurs as a result of orbital motion of shaft 306 creates a pneumatic pumping action that increases the static film pressure, and thereby the static film stiffness, behind the foils. This increased static film stiffness apparently introduces additional non-linear damping and cushioning of the shaft 306 which inhibits resonant half-speed whirl thereof.

The foregoing are some of the actions which are known or thought to occur in the hydrodynamic radial bearing 300 of FIGS. 10 through 14, whereby the latter bearing reduces or eliminates half-speed whirl instability and avoids bearing failure due to any half-speed whirl instability that does exist. As already noted, for example, bearings constructed in accordance with the invention, have been run at speeds on the order of 300,000 to 600,000 r.p.m. for extended periods of time without failure.

The hydrodynamic radial bearing configuration of FIGS. 10 through 14 has one additional advantage over the earlier described bearings of the invention. Owing to the greater stiffness, i.e., higher spring rate, of the spring strip bearing foils 316 in FIGS. 10 through 14 than the earlier tensioned bearing foils, and the non-linear increase in spring rate which occurs as the bearing foils 316 deflect outwardly, the latter have a higher natural frequency than the bearing foils of the earlier forms of the invention. As a matter of fact, the natural frequency of the bearing foils 316 is so high that it is usually not encountered. However, the present bearings have been oversped through and beyond the resonant frequency of the foils without damage. Thus, maximum operating speed of the present bearing is not limited by resonant vibration of the bearing foils as would occur if the natural frequency of the foils was in the normal operating speed range of the bearing.

The modified radial hydrodynamic gas bearing 300a of FIG. 15 is identical to the bearing 300 just described except greater radial clearance is provided between the bushing 302 and the shaft 306 to accommodate spring cushions 400 between the bearing foils 316 and the surfaces 314 of the bushing. Crumpled Mylar film has been found to be suitable for the cushion, for example. Other resilient cushion materials may be used, however, such as the slit foil spring 500 of FIGS. 16 and 17.

In the bearings under consideration, the spring cushions 400, 500 increase the effective spring stiffness of the bearing foils and thereby the restraint which the foils impose against vibratory-excursions of the shaft. The spring cushions also introduce additional non-linear spring damping of such excursions and increase the natural frequency of the bearing foils.

The discussion thus far has dealt primarily with gaseous fluid lubricated hydrodynamic bearings. It has been found, however, that the present hydrodynamic bearing configuration will perform as well with liquid lubricants. For example, bearings constructed in accordance with the invention have been operated satisfactorily using alcohol as a lubricant.

At this point, several advantages of the present hydrodynamic bearing configurations, in addition to those already discussed, will be evident to those skilled in the art. Owing to the relatively large clearances and corresponding relatively small manufacturing tolerances involved in the present bearings, and their over-all simplicity, the latter are relatively inexpensive to make. Moreover, the large clearances render the bearings relatively dirt resistant and enable the bearings to accommodate relatively large misalignment of the shaft and bearing. Repair of the present bearings is obviously extremely simple since it involves merely replacing the bearing foils which can be quickly and easily accomplished.

It is evident from the preceding description that the effective stiffness of the present bearings is dependent on the stiffness of the bearing foils. These foils, then, may be made as stiff as necessary to afford the bearings with the bearing stiffness required for the shaft loads involved. It is to be understood, therefore, that the bearing foil thicknesses and other dimensions heretofore ing foil thicknesses and other dimensions heretofore given are intended to be purely illustrative.

Attention is directed to the fact that while the illustrated bearings are equipped with three bearing foils, they may embody more foils or only two foils, or even one foil. In the last case, the shaft would be rotatably supported in part by the rigid bearing bushing. This effectively increases the bearing stiffness but renders the bearing more prone to half-speed whirl instability.

Clearly, therefore, the invention is fully capable of attaining the objects and advantages set forth earlier. Various modifications in the design, arrangement of parts, and instrumentalities of the invention are possible, of course, within its spirit and scope.

I claim:
1. A film lubricated shaft bearing comprising:
a bearing unit having a shaft receiving opening and including a plurality of relatively thin, flexible, compliant bearing foils spaced around said opening and each extending generally circumferentially about a portion only of said opening;
said bearing foils being supported by said unit at at least two positions along each foil and being spaced from said unit intermediate said positions to provide a plurality of concave bearing surfaces resiliently rotatively supporting a shaft in said opening.
2. A bearing according to claim 1 wherein:
said bearing foils are non-resiliently flexible and are longitudinally stressed in tension when the shaft is positioned in said opening.
3. A bearing according to claim 1 wherein:
said bearing foils comprise separate, resiliently flexible spring strips.
4. A film lubricated shaft bearing comprising:
a supporting structure having a shaft receiving opening;
bearing means within said opening ilncluding a plurality of relatively thin, flexible, resiliently compliant bearing foils spaced around said opening and each extending generally circumferentially about said opening throughout at least a portion of the length of each bearing foil within the opening;
said bearing foils being supported by said structure at positions spaced along each foil and being spaced from said structure intermediate said positions rotatively supporting a shaft in said opening; and
said bearing foils having inwardly presented bearing surfaces adapted to be supplied with a lubricating fluid and to support the shaft for relative rotation to a speed at least sufficient to generate a hydrodynamic lubricating film between the shaft and each bearing surface, whereby said bearing foils are radially positioned relative to the shaft by hydrodynamic film pressure and resiliently accommodate and dampen orbital motion of the shaft.
5. A bearing according to claim 4 wherein:
said bearing foils are non-resiliently flexible and are longitudinally stressed in tension.
6. A bearing according to claim 4 wherein:
said bearing foils comprise separate, resiliently flexible spring strips.
7. A film lubricated shaft bearing comprising:
a supporting structure having a shaft receiving opening;
a plurality of separate relatively thin, flexible, resiliently compliant bearing foils uniformly spaced around said opening, each foil extending generally circumferentially about a portion only of the opening and presenting a concave bearing surface;
said bearing foils being supported by said structure at positions spaced along each foil and being spaced from the structure intermediate said positions rotatably supporting and resiliently coaxially positioning a shaft in said opening; and
said bearing foils having inwardly presented bearing surfaces adapted to be supplied with a lubricating fluid and to support the shaft for relative rotation to a speed at least sufficient to generate a hydrodynamic lubricating film between the shaft and each bearing foil, whereby said bearing foils are radially positioned relative to the shaft by hydrodynamic film pressure and resiliently accommodate and dampen orbital motions of the shaft.
8. A bearing according to claim 7 wherein:
said bearing foils are non-resiliently flexible; and each foil being fixed at its ends to said supporting structure and longitudinally stressed in tension to resiliently position the shaft.
9. A bearing according to claim 7 wherein:
said bearing foils are non-resiliently flexible and each foil is fixed at one end to said supporting structure; and
said bearing further includes a spring acting between said structure and the other end of each bearing foil for longitudinally stressing the latter in tension.
10. A bearing according to claim 9 including:
means for adjusting the tension in each bearing foil.
11. A film lubricated shaft bearing comprising:
a supporting structure having a shaft receiving opening and including a plurality of supporting posts parallel to the axis of said opening;
said posts being generally uniformly spaced about and disposed at the same radial distance from said axis;
a plurality of thin, non-resiliently flexible, resiliently compliant bearing foils extending about said posts and longitudinally stressed in tension to rotatably support and resiliently coaxially position a shaft in said opening; and
said bearing foils having inwardly presented, substantially flat bearing surfaces adapted to be supplied with a lubricating fluid and to support the shaft for relative rotation to a speed at least sufficient to generate a hydrodynamic lubricating film between the shaft and each bearing foil, whereby said bearing foils are radially positioned relative to the shaft by hydrodynamic film pressure and resiliently accommodate and dampen orbital motion of the shaft.
12. A film lubricated shaft bearing comprising:
a bushing having a shaft receiving bore;

a plurality of thin, flexible, resiliently compliant bearing foils within and extending generally circumferentially about said bore in normally spaced relation to the wall of said bore throughout at least a portion of the length of each bearing foil within the bore;

said bearing foils being uniformly spaced around said bore, each foil extending generally circumferentially about a portion only of said bore and having its opposite ends supported by said bushing;

said bearing foils rotatably supporting and being stressed to resiliently coaxially position a shaft in said bore;

said bearing foils having inwardly presented bearing surfaces adapted to be supplied with a lubricating fluid and to support the shaft for relative rotation to a speed at least sufficient to generate a hydrodynamic lubricating film between the shaft and each bearing surface, whereby said bearing foils are radially positioned relative to the shaft by hydrodynamic film pressure and resiliently accommodate and dampen orbital motion and the shaft; and the wall of said bore being effective to positively limit orbital excursions of the shaft.

13. A bearing according to claim 12 wherein:
said bearing foils are three in number.

14. A bearing according to claim 12 wherein:
said bearing foils are non-resiliently flexible; and
each bearing foil is attached at its ends to said bushing and is longitudinally stressed in tension.

15. A bearing according to claim 12 wherein:
said bearing foils comprise spring strips.

16. A bearing according to claim 12 wherein:
said bearing foils comprise spring strips which engage said bushing at their ends and are centrally spaced from the bushing to resiliently support the shaft.

17. A film lubricated shaft bearing comprising:
a bushing having a shaft receiving bore;
a plurality of thin, non-resiliently flexible, resiliently compliant bearing foils within said opening and each extending generally circumferentially about a portion only of said bore;
said bearing foils being uniformly spaced about said bore and being radially spaced from the wall of the bore throughout the length of each foil within the bore;
the ends of each bearing foil extending through slots in said bushing and being fixed to the bushing;
said bearing foils having inwardly presented bearing surfaces adapted to be supplied with a lubricating fluid and to support the shaft for relative rotation to a speed at least sufficient to generate a hydrodynamic lubricating film between the shaft and each bearing surface, whereby said bearing foils are radially positioned relative to the shaft by hydrodynamic film pressure and resiliently accommodate and dampen orbital motion of the shaft; and
the wall of said bore being effective to positively limit orbital excursions of the shaft.

18. A film lubricated shaft bearing comprising:
a bushing having a shaft receiving bore;
a plurality of thin, flexible, resiliently compliant spring strip bearing foils within said bore and each extending generally circumferentially about a portion only of said bore;
said bearing foils being uniformly spaced about said bore and the foils being terminally engaged with and centrally radially spaced from said bushing resiliently coaxially positioning a shaft in said bore;
said bearing foils having inwardly presented bearing surfaces adapted to be supplied with a lubricating fluid and to support the shaft for relative rotation to a speed at least sufficient to generate a hydrodynamic lubricating film between the shaft and each bearing surface, whereby said bearing foils are radially positioned relative to the shaft by hydrodynamic film pressure and resiliently accommodate and dampen orbital motion of the shaft; and
the wall of said bore being effective to positively limit orbital excursions of the shaft.

19. A bearing according to claim 18 wherein:
one end of each bearing foil is rigidly fixed to said bushing and the other end of each bearing foil slidably engages the wall of said bore.

20. A film lubricated shaft bearing comprising:
a bushing having a shaft receiving bore;
a plurality of thin, flexible, resiliently compliant spring strip bearing foils within said bore and each extending generally circumferentially about a portion only of said bore;
corresponding ends of said bearing foils extending to the exterior of said bushing through slots uniformly spaced about the bushing;
means rigidly securing the external end of each bearing foil to said bushing;
the opposite end of each bearing foil slidably engaging the wall of said bore;
said bearing foils having inwardly presented bearing surfaces adapted to be supplied with a lubricating fluid and to support a shaft for relative rotation to a speed at least sufficient to generate a hydrodynamic lubricating film between the shaft and each bearing surface, whereby said bearing foils are radially positioned relative to the shaft by hydrodynamic film pressure and resiliently accommodate and dampen orbital motion of the shaft; and
the wall of said bore being effective to positively limit orbital excursions of the shaft.

21. In combination:
a bearing unit having a shaft receiving opening;
a shaft positioned in said opening;
said bearing unit including a plurality of relatively thin, resiliently flexible, compliant foils uniformly spaced about the shaft, each of said foils having one end rigidly affixed to said bearing unit and the opposite end slidably positioned against the wall of said opening, each foil being spaced from said unit intermediate said ends, and each of said foils providing a separate concave bearing surface presented toward the shaft;
each bearing surface extending generally circumferentially about a portion only of said shaft;
said foils rotatably supporting said shaft within said opening; and
said bearing surfaces being adapted to be supplied with a lubricating fluid and to rotatably support said shaft for relative rotation to a speed at least snfficient to generate hydrodynamic lubricating films between the shaft and each bearing surface.

22. In combination:
a bushing having a shaft receiving bore;
a shaft positioned in said bore;
bearing means within said bore including a plurality of relatively thin, flexible, resiliently compliant bearing elements spaced around said shaft and each extending generally circumferentially about a portion only of the shaft;
said bearing elements being supported at their opposite ends by said bushing and being spaced from said bushing intermediate said ends for rotatably supporting and resiliently coaxially positioning the shaft in said bore;
said bearing elements having inwardly presented bearing surfaces adapted to be supplied with a lubricating fluid and to support the shaft for relative rotation to a speed at least sufficient to generate a hydrodynamic lubricating film between the shaft and each bearing surface, whereby said bearing elements are radially positioned relative to the shaft by hydrodynamic film pressure and resiliently accommodate and dampen orbital motion of the shaft; and the wall of said bore being effective to limit orbital excursions of said shaft.

23. In combination:

a shaft;

a bearing unit including bearing means rotatably supporting said shaft;

said bearing means providing a plurality of inwardly presented movable bearing surfaces including a thin, flexible, resiliently compliant bearing foil disposed in supporting relation to a surface of said shaft and having opposite ends supported by said bearing unit;

said bearing means rotatably supporting said shaft;

said bearing foil having an inwardly presented bearing surface being adapted to be supplied with a lubricating fluid and said bearing unit supporting said shaft for relative rotation to a speed at least sufficient to generate a hydrodynamic lubricating film between said shaft and bearing foil, whereby said foil is positioned relative to the shaft by hydrodynamic film pressure; and said bearing unit including a rigid surface behind and normally spaced slightly from said bearing foil for limiting compliant yielding of the latter.

24. A film lubricated shaft bearing comprising:

a bushing having a shaft receiving bore;

a shaft positioned in said bore;

a plurality of thin, flexible, compliant bearing foils within and extending generally circumferentially about said bore in normally spaced relation to the bore wall throughout at least a portion of the length of each bearing foil within the bore;

each of said foils having its opposite ends supported by said bushing and a portion intermediate said ends adjacent and substantially concentric with said shaft and spaced from said bore wall;

said foils rotatably supporting said shaft within said bore; and said substantially concentric portions of said foils presenting concave inwardly facing bearing surfaces which are adapted to be supplied with a lubricating fluid and to support the shaft for relative rotation and to resiliently accommodate and dampen orbital motion of the shaft.

25. In combination:

a bearing unit including a supporting structure having a shaft receiving opening;

a shaft positioned in said opening;

said bearing unit including a plurality of relatively thin, non-resiliently flexible, compliant foils, each of said foils having opposite ends rigidly affixed to the bearing unit, and each said foils providing a separate bearing surface presented toward the shaft, each bearing surface extending generally circumferentially about a portion only of said shaft;

said foils rotatably supporting said shaft in said opening; and said bearing surfaces being adapted to be supplied with a lubricating fluid and to rotatably support said shaft for relative rotation to a speed at least sufficient to generate hydrodynamic lubricating films between the shaft and each bearing surface.

References Cited

UNITED STATES PATENTS

| Re25,028 | 8/1961 | Thompson | 308—73 |
|---|---|---|---|
| 835,739 | 11/1906 | Sundberg | 308—147 |
| 1,352,204 | 9/1920 | Leitch | 308—26 X |
| 1,384,173 | 7/1921 | Wikander | 308—26 X |
| 1,595,744 | 8/1926 | Trumpler | 308—26 X |
| 2,363,260 | 11/1944 | Peskin | 308—73 |
| 2,703,735 | 3/1955 | Falk et al. | 308—26 |
| 2,757,050 | 7/1956 | Weber et al. | 308—26 X |
| 3,215,480 | 11/1965 | Marley | 308—121 |

FOREIGN PATENTS

| 479,330 | 12/1915 | France. |
|---|---|---|
| 22,815 | 10/1913 | Great Britain. |
| 883,820 | 12/1961 | Great Britain. |
| 24,504 | 4/1908 | Sweden. |
| 24,820 | 4/1908 | Sweden. |

MARTIN P. SCHWADRON, *Primary Examiner.*

FRANK SUSKO, *Assistant Examiner.*

U.S. Cl. X.R.

308—73, 121, 26

PO-1050
(5/69)

UNITED STATES PATENT OFFICE
CERTIFICATE OF CORRECTION

Patent No. 3,434,761                Dated  March 25, 1969

Inventor(s) David J. Marley

It is certified that error appears in the above-identified patent and that said Letters Patent are hereby corrected as shown below:

Column 17, line 72, after "ing" insert -- in normally spaced relation to the wall of said opening --. Column 19, line 21, for "and", second occurrence, read -- of --.

SIGNED AND
SEALED
MAR 10 1970

(SEAL)
Attest:

Edward M. Fletcher, Jr.
Attesting Officer

WILLIAM E. SCHUYLER, JR.
Commissioner of Patents